Sept. 6, 1966 C. C. WILLIAMS 3,270,832
APPARATUS FOR GENERATING SEISMIC IMPULSES
USED IN GEOLOGICAL EXPLORATION
Filed Dec. 9, 1963 2 Sheets-Sheet 1

INVENTOR.
Charles C. Williams
BY
Hovey, Schmidt, Johnson & Hovey
ATTORNEYS.

Sept. 6, 1966  C. C. WILLIAMS  3,270,832
APPARATUS FOR GENERATING SEISMIC IMPULSES
USED IN GEOLOGICAL EXPLORATION
Filed Dec. 9, 1963                                    2 Sheets-Sheet 2

INVENTOR.
Charles C. Williams
BY
Hovey, Schmidt, Johnson & Hovey
ATTORNEYS.

United States Patent Office 3,270,832
Patented Sept. 6, 1966

3,270,832
APPARATUS FOR GENERATING SEISMIC IMPULSES USED IN GEOLOGICAL EXPLORATION
Charles C. Williams, Wichita, Kans., assignor to Imperial Industries, Inc., Dallas, Tex., a corporation of Kansas
Filed Dec. 9, 1963, Ser. No. 328,849
11 Claims. (Cl. 181—.5)

This invention relates to seismic geological exploration equipment, and more particularly, to apparatus for generating a sonic impulse at the surface of the earth.

In relatively recent years a method of producing sonic impulses in the ground for seismic exploration purposes has been developed wherein a massive hammer is acceleratively driven into impactive engagement with a coupling plate engaging the surface of the earth. The impact of the hammer produces the sonic impulse, the reflection of which may be sensed and recorded by well-known seismic equipment to thereby reveal information about the subsurface geological composition of the earth.

Equipment of the type mentioned for conducting seismic exploration, particularly for locating underground petroleum deposits, has met with widespread commercial acceptance. However, certain problems encountered in the use of such equipment and a failure to fully recognize the importance of the selection of certain optimum design parameters have, to some extent, limited the extent of the benefits to be derived from the use of such equipment.

Some of the problems heretofore experienced in the use of equipment of this type have resulted from the recoil of the components of the equipment experienced after impact of the hammer on the plate. One result of the recoil has been the effecting of multiple impacts producing a series of sonic impulses which result in extremely complicated readings when the earth's responses to the impulses are reflected upwardly to the recording equipment. The recordings are much less complex and therefore, the observers are better able to interpret the earth's responses when a single, sharply decaying impulse is generated.

Further problems encountered in sonic impulse generating operations which result from the recoil experienced in the equipment relate to excessive damage of the equipment from stresses generated by the recoil.

Similarly, because the energy levels of this method of generating seismic energy are, in comparison to methods using explosive powder, very low, it is important that the level and efficiency of energy injection be maximized. This is necessary to assure that the seismic reflections are strong enough to be useful for geological survey purposes. Both the amount of recoil attendant upon the operation of equipment of this type and the efficiency of energy injection are, respectively, functions of the relationship of the masses of the components of the equipment. Certain generally optimum ratios have been discovered which substantially eliminate the problems of recoil with sonic impulse generating equipment and enhance the level of energy injection for seismic exploration purposes.

Accordingly, it is the most important object of this invention to provide sonic impulse generating equipment having improved energy level injecting capabilities and wherein the recoil of the components after impact is kept to a reasonable minimum.

Another important object of the invention and attainable in the achievement of the foregoing object is to provide equipment capable of producing a single sonic impulse upon each operation of the equipment for clearly reflecting the geological composition of the earth.

A further object of the instant invention is to provide a coupling plate for engaging the earth's surface and having means for securing the plate firmly to the surface of the earth to facilitate injection of a relatively powerful sonic impulse into the ground as a result of impactive engagement of the hammer with the plate.

Still another object of the invention is to provide means for attaching the plate to the frame assembly for transport of the sonic generating equipment, yet permitting ready uncoupling of the plate during use to minimize recoil and to enhance injection into the earth of relatively high energy level impulses by the equipment.

A still further object of the instant invention is to provide means for coupling the plate to the frame assembly, which means is not rigidly secured on the plate when the latter is in use so that the coupling means is not damaged by the severe impactive stress imparted to the plate by the hammer.

Still other important objects of this invention will be pointed out or will become apparent as the specification progresses.

In the drawings:

FIG. 6 is a fragmentary, diagrammatic illustration on a reduced scale of a coupling plate element on the surface of the earth showing the zone of compaction of the particles of earth resulting from impactive engagement of the hammer with the plate element.

Figure 1:
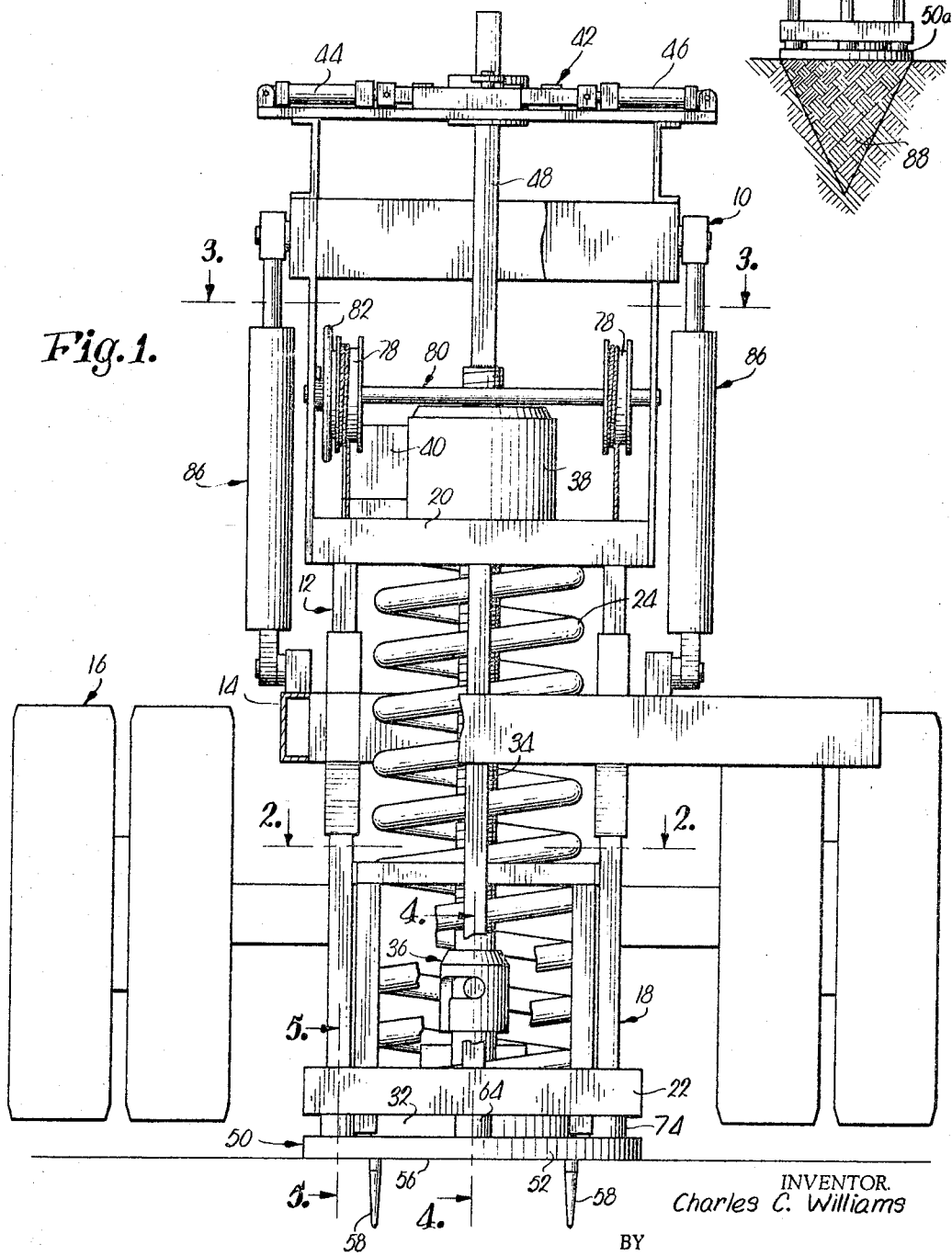
FIGURE 1 is a rear elevational view of the seismic impulse generating apparatus embodying the principles of the instant invention, parts being broken away for clearness.
Figure 2:
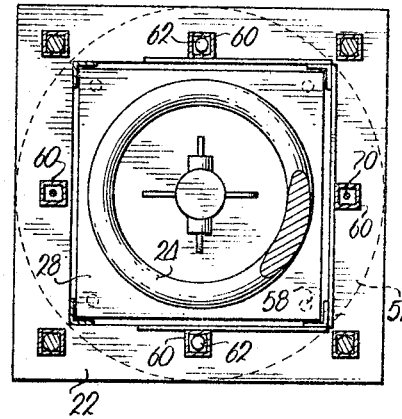
FIG. 2 is a cross-sectional view taken along line 2—2 of FIG. 1.
Figure 3:
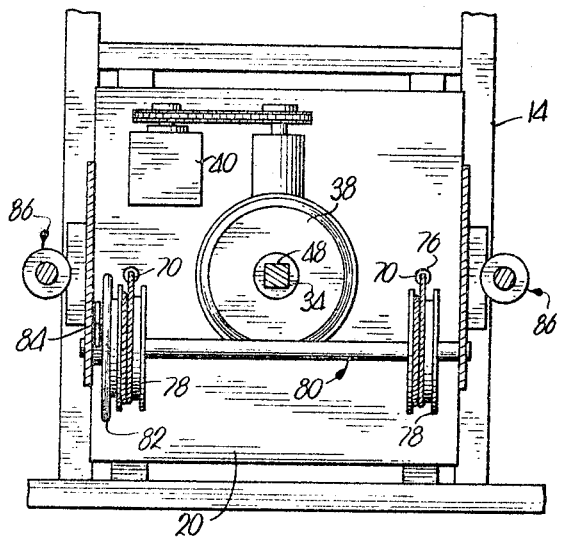
FIG. 3 is a view taken along line 3—3 of FIG. 1.
Figure 5:
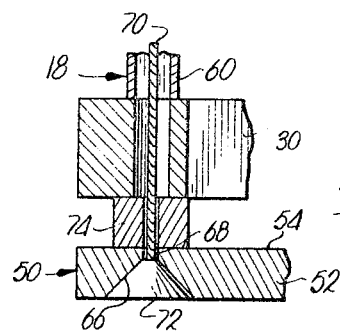
FIG. 5 is an enlarged, fragmentary view taken along line 5—5 of FIG. 1.
Figure 4:
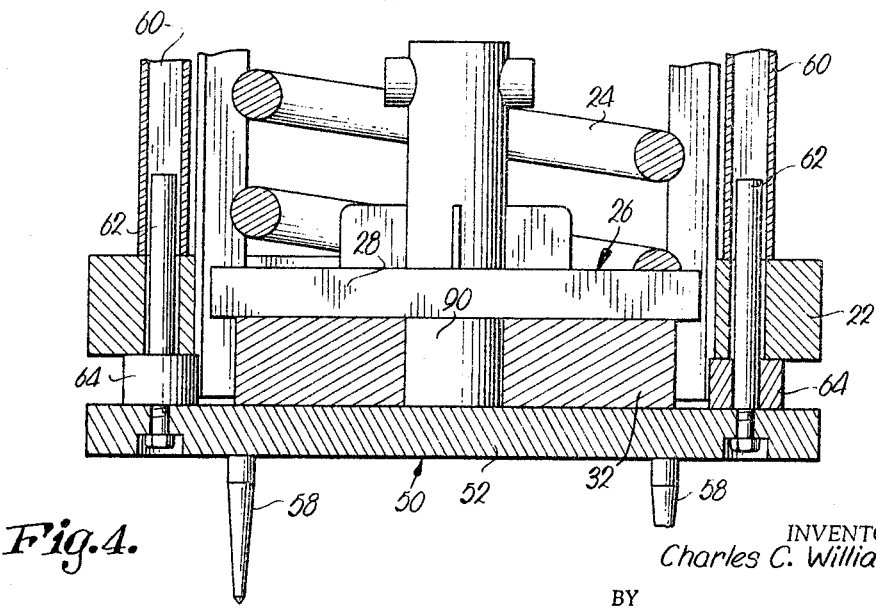
FIG. 4 is an enlarged, fragmentary view taken along line 4—4 of FIG. 1.

Referring to the drawings, apparatus for conducting seismic exploration by means of sonic impulses injected into the ground, is shown in FIG. 1 and broadly designated by the numeral 10. Equipment of this general type and the method of employment thereof, is fully described in my copending application Serial No. 75,346, filed December 12, 1960, now Patent Number 3,209,854, and entitled "Impact Method and Apparatus for Generating a Sonic Impulse Employed in Seismic Geological Exploration." Accordingly, it is not deemed to be necessary to describe the apparatus in detail. It should be noted, however, that apparatus 10 includes a generally upright frame assembly 12 which may be mounted for vehicular transportation upon the frame 14 of a truck broadly designated 16.

A cage 18, having an upper plate 20 and an annular lower plate 22, encloses spring structure 24 which engages the bottom surface of upper plate 20 and the upper surface of a hammer assembly 26 which is vertically reciprocable within cage 18. Assembly 26 includes a generally rectangular plate 28 of a size permitting passage thereof through the rectangular opening 30 of plate 22.

A massive hammer 32 which may be constructed of aluminum or the like, is rigidly secured to the bottom of plate 28 and may be acceleratively driven with the latter by spring 24. The hammer assembly 26 is lifted against the bias of spring 24 by means of an externally threaded shaft 34 and a coupler assembly 36. Shaft 34 passes through a gear box 38 mounted on upper plate 20, and gears (not shown) within box 38 engage the outer threaded surface of shaft 34 for lifting the latter as the gears are driven by a prime mover 40.

Engaging means 42 operably coupled with shaft 34 is provided for selectively attaching shaft 34 to hammer assembly 26 by means of coupler assembly 36 and also for disengaging the latter from the hammer assembly 26 to permit the latter to be acceleratively driven by spring 24. Engaging means 42 comprises a pair of fluid piston and cylinder assemblies 44 and 46 operably coupled to the uppermost, transversely square portion 48 of shaft 34 to impart torque for rotating shaft 34, the direction of rotation depending upon the direction of operation of the cylinders 44 and 46. Thus, when the cylinders 44 and 46 are operated in one direction, the shaft 34 may be rotated in a direction to effect the interlocking of the hammer assembly 26 to shaft 34. After the hammer assembly 26 has been moved against the bias of spring 24 to an elevated position, the operation of the cylinders 44 and 46 in an opposite direction, will effect release of the hammer assembly 26 from the shaft 34 to permit the assembly 26 to be acceleratively driven downwardly under the bias of spring 24.

A coupler plate broadly designated 50 is provided for impactive engagement by the hammer 32 and is adapted to be disposed in engagement with the surface of the earth for transmitting the power of the impact into the earth to produce a sonic impulse which is reflected by the earth to reveal the geological composition thereof when analyzed after having been detected and recorded by well-known seismic equipment.

Coupling plate 50 comprises a generally flat, circular plate 52 having a pair of opposed major faces 54 and 56. The lowermost face 56 engages the surface of the earth and a plurality of downwardly extending spikes 58 project therefrom. The spikes 58 are located at spaced intervals on face 56 and are adapted to enter the earth beneath plate 52 for firmly coupling the latter into close engagement with the surface of the earth. It has been found that four spikes 58 are normally sufficient to effect a close coupling between the plate 52 and the earth.

The cage 18 includes four upright, tubular members 60. A pair of upright guides 62 are bolted to either side of plate 52 and are slidably received within two of the upright members 60. Spacer washers 64 are disposed around the guides 62 and are in position to be engaged by the lower plate 22 of cage 18 when the latter is lowered over plate 52 to hold the cage 18 in spaced relationship from the upper surface of plate 52, yet to permit the weight of the cage to be transmitted to plate 52 for holding the latter in firm engagement with the surface of the earth.

A tapered recess 66 in the lowermost face 56 of plate 52 underlies each of the upright, tubular members 60 which does not contain a guide 62. The recesses 66 terminate in apertures 68 of substantially smaller cross-sectional areas than the recesses 66, and an elongated, flexible element, such as a cable or the like, passes through the corresponding aperture 68 and the upright, tubular members 60. The lowermost end of the element 70 has an enlargement 72 thereon which may be integral with element 70 and is complementally-shaped to fit within the recess 66 for securing element 70 to plate 52. A spacer washer 74 may be disposed around each element 70 to assist in transmitting the weight from the lower plate 22 of cage 18 to plate 52.

The upper end of each element 70 passes through an aperture 76 in upper plate 20 of cage 18 where it is secured to the corresponding drum 78 of a windlass assembly 80. A hand-wheel 82 on windlass 80 cooperates with a ratchet assembly 84 to permit manual operation of assembly 80 for winding the cables 80 to effect lifting of coupler plate 50 for transporting the latter when the apparatus 10 is not in use.

Power means 86 at either side of apparatus 10, is utilized for hoisting or lowering the cage 18. It will be understood that cage 18 may be elevated to permit transporation of apparatus 10 from one position to another and will normally be lowered onto plate 52 when the latter is disposed in position in engagement with the surface of the earth with the weight of the cage-truck complex firmly holding plate 50 in contact with the earth.

It is preferable to use a circular coupling plate for seismic exploration purposes because coupling plates of irregular or other shapes have a tendency to generate spurious sonic impulses which may be reflected and recorded, resulting in complication of the geological information obtained. It is recognized that the utilization of a circular coupling plate causes the compaction of a cone of earth lying immediately beneath the coupling plate and that the depth of this cone of compaction is a function of the diameter of the coupling plate. The relationship between a cone of compaction 88 and its particular coupling plate 50a is diagrammatically represented in FIG. 6.

It is necessary that the power injected into the earth by apparatus 10 be equal to or exceed a certain minimum value in order for the sonic impulse generated thereby to be useful in seismic exploration. The power injected by use of apparatus of this type is a direct function of the square of the velocities of the particles of earth in the cone of compaction after the impact of the hammer 32 on plate 52.

The earth particle velocity $v$ upon the impact of hammer 32 on plate 52 may be expressed by the following formula $$v = u(M/M+n)(1+e)(n/n+z)(1+e')$$

where:

$u$ = velocity of hammer 32 at impact
$M$ = mass of hammer 32
$n$ = mass of coupling plate 50
$z$ = effective mass of earth cone of compaction 88
$e$ = coefficient of restitution at the hammer 32—coupling plate 50 boundary
$e'$ = coefficient of restitution at the coupling plate 50—earth cone 88 boundary Thus, to compare the reactions in terms of earth particle velocity of an impact of an acceleratively driven hammer on the earth with and without a coupling plate being interposed between the hammer and the earth, the reaction without the coupling plate may be expressed as follows:

$$v = u(M/M+z)(1+e')$$

Then, if the hammer mass $M$ is large with respect to both the coupling plate mass $n$ and the earth cone mass $z$, it follows that, as a close approximation, $$M/H+z \cong M/M+n$$

Hence, assuming that the value for the coefficient of restitution at the coupling plate—earth cone boundary $e'$ is constant, the particle velocity ratio $R_v$ as between impact with and without the coupling plate may be expressed:

$$R_v \cong (1+e)(n/n+z)$$

Since the hammer-coupling plate boundary is an elastic boundary, that is $e=1$, the ratio may be written:

$$R_v \cong 2n/n+z$$

If the hammer mass $M$ is large, then obviously the earth cone mass $z$ must be small with respect to the coupler plate mass $n$ to achieve maximum earth particle velocity.

Repeated impact increases the elasticity of the coupler plate-earth boundary which may be expressed as a function of the coefficients of restitution of the earth before and after impact thus:

$$f = (1+e'')/(1+e')$$

where $e''$ is the coefficient of resitution after compaction. Hence, the complete expression for the particle velocity ratio, taking into consideration the compaction of the earth, is:

$$R_v \cong 2nf/n+z$$

Obviously, the desirability of a small earth cone mass $z$ with respect to the coupler plate mass $n$ remains. The expression is maximized as the mass $z$ becomes small with respect to the mass $n$. Since the mass $z$ is directly proportional to the contact area of the mass $n$, it follows that the earth-contact area of $n$ should be as small as is possible consistent with the elastic characteristics of the surface medium. Further, the foregoing equations clearly reveal the energy level increase and energy injection efficiency which follows from the use of a coupler plate such as plate 50 in generating seismic impulses for geologic exploration.

There are two distinct harmful results from recoil of the components during operation of seismic geological exploratory apparatus of the type herein contemplated. First, the excessive recoil causes extreme physical stresses resulting in the breaking or deforming of the materials which either destroy or limit the use of the apparatus. A more important by-product, however, of recoil in apparatus of this type, is the injection into the earth of a plurality of sonic impulses, the reflection of which distorts and obscures the recordings from which the geological composition of the earth is computed. Ideally then, if recoil could be eliminated during the operation of apparatus 10, a single sonic impulse would be generated which would be much more meaningful to geologists than are recordings made from a series of impulses.

It has been found that certain optimum relationships between various components of sonic impulse generating apparatus of this type minimize recoil to the utmost, if in fact, do not completely eliminate recoil as a problem.

The recoil of a first body moving into impact with a second body is a function of the mass of the second body divided by the mass of the first body. Thus, $$a' = -(M/Mc)a + g$$

where:

$a'$=acceleration of the truck 16 (including frame 12) and cage 18 complex
$M$=mass of hammer 32
$Mc$=mass of the truck-cage complex
$a$=acceleration of hammer 32
$g$=gravitational acceleration From the above, it is clear that the recoil acceleration of the truck-cage complex is a function of the mass ratio ($M/Mc$), and that the smaller the mass of the acceleratively driven hammer with respect to the mass of the truck-cage complex, the smaller will be the recoil acceleration of the truck-cage complex.

With respect to the recoil of hammer 32 after impact on the coupler plate 50, one may write:

$$u' = n[1 - (n/M+n)(1+e)]$$

and $$v'' = v'[1 - (z/n+z)(1+e')]$$

where:

$u'$=velocity of hammer 32 after hammer-coupler plate impact
$v'$=velocity of coupler plate 50 before coupler plate-earth cone impact
$v''$=velocity of coupler plate 50 after coupler plate-earth cone impact.

These equations define the motional reactions of the hammer 32 and coupler plate 50 following impact. It should be pointed out that the values for the coefficients of restitution $e$ and $e'$ vary between 1 and 0 as the boundary conditions vary between elastic and inelastic impact. It is probable that the impact boundary between the hammer and coupler plate is very nearly elastic wherein the value of the expression ($1+e$) is very nearly 2. However, the value for the expression ($1+e'$) is dependent upon the elasticity of the impact boundary between the coupler plate and the earth. Thus, the value of ($1+e'$) depends upon the earth surface formation encountered in the seismic impulse generation operation. It has been found that this value may vary from 1.2 to very nearly 2 as the surface formations encountered vary from relatively unconsolidated to relatively hard materials.

From the above it is clear that the value for $u'$ can be negative (the recoil condition) only when the hammer mass $M$ is less than that of the mass of the coupler plate $n$. If the hammer mass $M$ is equal to, or greater than, the coupler plate mass $n$, then there is no recoil at hammer-coupler plate impact. Likewise, if the coupler plate mass $n$ is equal to or greater than the effective mass $z$ of the earth cone, then there is no recoil at the coupler plate-earth cone impact.

Desirably, the truck does not recoil from the hammer assembly, but rather the hammer assembly recoils from the truck and in a direction toward the earth. Similarly, it is desirable that the coupling plate recoil from the hammer and in a direction toward the earth. If, for example, the mass of the coupling plate were greater than the mass of the hammer assembly, the hammer assembly would recoil from the coupling plate and, under the force of spring 24, would strike the plate 52 a second time to create a second sonic impulse.

It is necessary that the mass of the truck-frame complex be greater at all times than the mass of the hammer assembly and that the mass of the hammer assembly always be greater than the mass of the coupling plate. Further, it is desirable that certain rather important relationship values between the respective masses be adhered to. It has been found that the mass of the truck-frame complex should be at least ten times greater than the mass of the hammer assembly. It has also been found that satisfactory results occur when the mass of the hammer assembly is chosen at a value which is at least two times greater than the mass of the coupling plate. Further, experiments have shown that the mass of the hammer assembly should be greater than the combined masses of the coupling plate and the cone of compaction, preferably on the order of five times greater (if obtainable in practice) for optimum results.

It is readily apparent that the mass of the zone of compaction is determined by the diameter of plate 52. There are certain limiting factors which must also be taken into consideration in addition to the mass of the piston of earth which will be compacted upon the impact of the hammer 32 on plate 52. Thus, the diameter of plate 52 must not be selected so small that the force per unit of area exerted upon the ground by the impact on plate 52 exceeds the elastic limit of the earth. If this force is greater than the elastic limit of the earth, a substantial amount of the energy from the impact is consumed in deforming the earth and is not available as a sonic impulse having useful geological meaning.

On the other hand, the size of the coupling plate must never be chosen so large that the combined masses of the plate and the cone of compaction of earth underlying the plate are greater than the mass of the hammer. A further limitation upon the size of plate 52 suitable for sonic impulse generating purposes is that the plate may not be so much greater in diameter than the hammer that the inertia of the outer peripheral margin of the plate upon impact induces stresses in the plate which are capable of deforming the plate to render the latter unsuitable for further use.

The configuration of the cone of compaction 88 is regular as illustrated in FIG. 6 when the plate 52 is in firm, relatively solid engagement with the surface of the earth. In order to achieve a satisfactory relationship between the mass of the hammer assembly 26 and the cone of compaction 88 and plate 52 complex, it is important that the plate 52 be rather firmly engaged with the earth. Accordingly, the spikes 58 serve an important and useful function in binding the plate 52 firmly to the earth. This binding is additionally beneficial in eliminating the possibility of a plurality of spurious vibrations between the plate and the earth upon a single impact of the hammer upon the plate.

A further important consideration in effecting the desirable relationship between the components of apparatus 10, is that the coupling plate 50 may be effectively uncoupled from the remaining components of apparatus 10 during utilization of coupling plate 50 for sonic impulse generating purposes. Although it is necessary to have apparatus for attaching the coupling plate 50 to cage 18 for transport from one impulse generating position to another, such attachment during use of apparatus 10 would result in connection of the truck-frame complex with the plate to disturb the proper mass relationship between the components for effectively eliminating recoil. Thus, the elements 70 may be loosened by the windlass assembly 80 to an extent that they become quite flexible so that plate 52 is free to move upon impact entirely independently of the other components of apparatus 10. The inertia of plate 52 proximal the outer peripheral margin thereof is not effectively increased by the enlargements 72 inasmuch as the latter are completely independent of plate 52.

A further distinct advantage of a coupling between plate 52 and apparatus 10 wherein an independent enlargement 72 complementally received within a tapered recess such as 66, is that there is thereby presented no attaching member rigidly secured to plate 52. Such an attaching member would likely be broken from plate 52 as a result of the terrific impactive stresses generated by impact of the hammer 32 upon the plate. The loosening of the elements 70, however, completely disengages the enlargement members 72 from the plate while the latter is in use to preclude any damaging effects upon the means for coupling plate 52 to apparatus 10 during use.

It has been found that a desirable relationship between the masses of components of apparatus 10 can be achieved by the selection of a light, tough metal for the fabrication of plate 52 and hammer 32. Aluminum is suitable for both of these components. If desired, a core 90 of ferro-magnetic material may be inserted in the aluminum hammer 32 for activation of magnetically responsive signal initiating equipment (not shown) utilized in conjunction with apparatus 10.

Having thus described the invention, what is claimed as new and desired to be secured by Letters Patent is:

1. Apparatus for generating a sonic impulse employed in seismic geological exploration comprising:
   a generally flat coupling plate adapted to be positioned during use with one major face thereof in substantially horizontal, flat engagement with the ground and entirely supported thereby;
   an upright frame assembly;
   a hammer reciprocable in said frame assembly and disposed to impactively engage the plate; and
   structure carried by the frame assembly and operably coupled with the hammer for driving the hammer into impactive engagement with the plate, the mass of the frame assembly being greater than the mass of the hammer and the mass of said hammer being substantially greater than the mass of said plate, whereby the recoil of the hammer and frame assembly after said impactive engagement is kept to a minimum.

2. Apparatus as set forth in claim 1, wherein the mass of the frame assembly is at least approximately ten times greater than the mass of the hammer and the mass of the hammer is at least approximately two times greater than the mass of the plate.

3. Apparatus for generating a sonic impulse employed in seismic geological exploration comprising:
   a generally flat coupling plate adapted to be positioned during use with one major face thereof in substantially horizontal, flat engagement with the ground and entirely supported thereby;
   an upright frame assembly;
   a hammer reciprocable in said frame assembly and disposed to impactively engage the plate for compressing a generally conical piston of earth immediately underlying said plate which is compressed by impact on the plate; and
   structure carried by the frame assembly and operably coupled with the hammer for driving the hammer into impactive engagement with the plate, the mass of the frame assembly being greater than the mass of the hammer and the mass of the hammer being greater than the combined masses of the plate and said piston of earth, whereby recoil of the hammer and frame assembly after said impact is kept to a minimum.

4. Apparatus as set forth in claim 3, wherein the mass of said frame assembly is at least approximately ten times greater than the mass of said hammer.

5. Apparatus as set forth in claim 3, wherein said plate is of aluminum.

6. Apparatus as set forth in claim 3, wherein said hammer is of aluminum.

7. Apparatus for generating a sonic impulse employed in seismic geological exploration comprising:
   a frame assembly;
   a coupling plate adapted to be positioned in engagement with the ground during use thereof;
   means operably coupled with the frame assembly and with the plate for shiftably securing the plate to the frame assembly for permitting movement of the plate with the frame assembly when the apparatus is not in use and movement of the plate independently of the frame assembly when the apparatus is in use;
   a hammer reciprocable in the frame assembly and disposed to impactively engage the plate for generating a sonic impulse in the ground; and
   means carried by the frame assembly for driving the hammer into impactive engagement with the plate;
   said securing means including a windlass assembly carried by the frame assembly, and an elongated, flexible element secured to the windlass assembly and to said plate.

8. Apparatus as set forth in claim 7, wherein the plate has a pair of opposed, generally flat, major faces, there being a tapered recess in the lowermost of said faces terminating in an aperture in communication with the uppermost of said faces, the diameter of the recess being increased as the lowermost face is approached, the flexible element disposed through the aperture and into said recess, and a member secured to the element and complementally received in the recess for securing the element to the plate.

9. Apparatus as set forth in claim 8, wherein said recess is conical, the member being configured to complementally fit within said recess.

10. Apparatus for generating a sonic impulse employed in seismic geological exploration comprising:
   a generally flat coupling plate adapted to be positioned during use with one major face thereof in substantially horizontal, flat engagement with the ground and entirely supported thereby, said plate having spike means extending outwardly from said one face for securely coupling the plate with the ground;
   an upright frame assembly;
   a hammer reciprocable in said frame assembly and disposed to impactively engage the plate for compressing a generally conical piston of earth immediately underlying said plate and coupled thereto by said spike means which is compressed by impact on the plate; and
   structure carried by the frame assembly and operably coupled with the hammer for driving the hammer into impactive engagement with the plate, the mass of the frame assembly being greater than the mass of the hammer and the mass of the hammer being greater than the combined masses of the plate and said piston of earth, whereby recoil of the hammer and frame assembly after said impact is kept to a minimum.

11. Apparatus for generating a sonic impulse employed in seismic geological exploration comprising:
an upright frame assembly;
a generally flat coupling plate adapted to be positioned during use with one major face thereof in substantially horizontal, flat engagement with the ground and entirely supported thereby;
means operably coupled with the frame assembly and with the plate for shiftably securing the plate to the frame assembly for permitting movement of the plate with the frame assembly when the apparatus is not in use and movement of the plate independently of the frame assembly when the apparatus is in use;
a hammer reciprocable in the frame assembly and disposed to impactively engage the plate; and
structure carried by the frame assembly and operably coupled with the hammer for driving the hammer into impactive engagement with the plate, the mass of the frame assembly being greater than the mass of the hammer and the mass of the hammer being substantially greater than the mass of said plate, whereby the recoil of the hammer and frame assembly after said impactive engagement is kept to a minimum.

References Cited by the Examiner
UNITED STATES PATENTS

| | | | |
|---|---|---|---|
| 2,933,068 | 4/1960 | Johnson et al. | 181—0.5 |
| 3,159,232 | 12/1964 | Fair | 181—0.5 |
| 3,193,046 | 7/1965 | Williams | 181—0.5 |

BENJAMIN A. BORCHELT, *Primary Examiner.*
G. H. GLANZMAN, *Assistant Examiner.*